(12) United States Patent
Moulin et al.

(10) Patent No.: US 12,275,584 B2
(45) Date of Patent: *Apr. 15, 2025

(54) ORDER DELIVERY SYSTEM AND METHOD

(71) Applicant: EXOTEC PRODUCT FRANCE, Croix (FR)

(72) Inventors: Romain Moulin, Lille (FR); Renaud Heitz, Villeneuve-D'Ascq (FR); Gilles Baulard, Fontenilles (FR)

(73) Assignee: EXOTEC PRODUCT FRANCE, Croix (FR)

( * ) Notice: Subject to any disclaimer, the term of this patent is extended or adjusted under 35 U.S.C. 154(b) by 636 days.

This patent is subject to a terminal disclaimer.

(21) Appl. No.: 17/626,666

(22) PCT Filed: Sep. 2, 2020

(86) PCT No.: PCT/EP2020/074474
§ 371 (c)(1),
(2) Date: Jan. 12, 2022

(87) PCT Pub. No.: WO2021/043828
PCT Pub. Date: Mar. 11, 2021

(65) Prior Publication Data
US 2022/0245582 A1    Aug. 4, 2022

(30) Foreign Application Priority Data

Sep. 2, 2019 (FR) ...................................... 1909641

(51) Int. Cl.
*B65G 1/04* (2006.01)
*B65G 1/137* (2006.01)
(Continued)

(52) U.S. Cl.
CPC ......... *B65G 1/0457* (2013.01); *B65G 1/1378* (2013.01); *G06Q 10/0836* (2013.01);
(Continued)

(58) Field of Classification Search
CPC ................ B65G 1/0457; B65G 1/1378; B65G 2201/0238; B65G 17/485; B65G 17/20;
(Continued)

(56) References Cited

U.S. PATENT DOCUMENTS 3,647,026 A * 3/1972 Alexander .............. E04H 14/00
                                                          221/268
4,805,738 A    2/1989 Vayda
(Continued)

FOREIGN PATENT DOCUMENTS

BE        1019931 A3    2/2013
CN        106185150 A   12/2016
(Continued)

OTHER PUBLICATIONS

Rapert, Marcel et al. Enhancing supply chain visibility in a pharmaceutical supply chain. International Journal of Physical Distribution & Logistics Management; Bradford vol. 46, Iss. 9, (2016): 859-884. (Year: 2016).*

(Continued)

*Primary Examiner* — Fawaad Haider
(74) *Attorney, Agent, or Firm* — David D. Brush; Westman, Champlin & Koehler, P.A.

(57) ABSTRACT

A system for automatically delivering an order to a pick-up location outside a building. Such a system includes: pouches adapted to receive a bag, associated with the control; a device for signalling and/or detecting presence of a customer in the vicinity of a pick-up location; and a height-mounted transport module, which includes: a suspension element for suspending the pouches from a travel track, the suspension elements being moved automatically on the track; and an actuator to displace the pouches in which the different parts of the order have been deposited, to the pick-up location when the device for signalling and/or detecting emit a signal (Continued)

confirming the presence of the user in the vicinity of the pick-up location.

11 Claims, 6 Drawing Sheets

(51) Int. Cl.
    *G06Q 10/08*     (2024.01)
    *G06Q 10/0836*     (2023.01)
    *G06Q 10/087*     (2023.01)

(52) U.S. Cl.
    CPC ... *G06Q 10/087* (2013.01); *B65G 2201/0238* (2013.01); *B65G 2209/04* (2013.01); *B65G 2209/08* (2013.01); *G06Q 10/08* (2013.01)

(58) Field of Classification Search
    CPC ............ B65G 2209/08; B65G 2209/04; G06Q 10/0836; G06Q 10/087; G06Q 10/08; G06Q 30/06; E04H 14/00; E04H 3/04
    USPC .......................................................... 705/28
    See application file for complete search history.

(56) References Cited

U.S. PATENT DOCUMENTS

| | | | |
|---|---|---|---|
| 7,381,022 | B1 | 6/2008 | King |
| 2003/0097201 | A1 | 5/2003 | Min |
| 2013/0240328 | A1 | 9/2013 | Nukui et al. |
| 2015/0259153 | A1 | 9/2015 | Buchmann |
| 2016/0125685 | A1 | 5/2016 | Odisho |
| 2020/0189846 | A1 | 6/2020 | Sutter |
| 2021/0327012 | A1* | 10/2021 | Issing .................. G05D 1/0217 |

FOREIGN PATENT DOCUMENTS

| | | | |
|---|---|---|---|
| DE | 19717352 | A1 | 10/1997 |
| DE | 10147551 | A1 | 4/2003 |
| DE | 102009014457 | A1 | 10/2010 |
| EP | 1801040 | A1 | 6/2007 |
| FR | 2667849 | A1 | 4/1992 |
| GB | 2294437 | A | 5/1996 |
| JP | S49143981 | U | 12/1974 |
| JP | 2002249209 | A | 9/2002 |
| JP | 2004062539 | A | 2/2004 |
| JP | 2018010697 | A | 1/2018 |
| WO | 2015118182 | A1 | 8/2015 |
| WO | 2018162123 | A1 | 9/2018 |

OTHER PUBLICATIONS

English translation of the Written Opinion of the International Searching Authority dated Feb. 16, 2021 for corresponding International Application No. PCT/EP2020/074489, filed Sep. 2, 2020.
English translation of the Written Opinion of the International Searching Authority dated Jan. 21, 2021 for corresponding International Application No. PCT/EP2020/074474, filed Sep. 2, 2020.
International Search Report dated Jan. 11, 2021 for corresponding International Application No. PCT/EP2020/074474, Sep. 2, 2020.
Written Opinion of the International Searching Authority dated Jan. 11, 2021 for corresponding International Application No. PCT/EP2020/074474, filed Sep. 2, 2020.
International Search Report dated Feb. 5, 2021 for corresponding International Application No. PCT/EP2020/074489, Sep. 2, 2020.
Written Opinion of the International Searching Authority dated Feb. 5, 2021 for corresponding International Application No. PCT/EP2020/074489, filed Sep. 2, 2020.
Non-Final Rejection for U.S. Appl. No. 17/626,668, mailed Oct. 13, 2023, 9 pages.
English translation and Chinese Office Action dated Sep. 7, 2024 for corresponding Chinese Application No. 202080060367.6.
Japanese Notice of Reasons for Refusal dated Oct. 1, 2024 for corresponding Japanese Application No. 2022-514169.

* cited by examiner

ORDER DELIVERY SYSTEM AND METHOD

1. CROSS-REFERENCE TO RELATED APPLICATIONS

This Application is a Section 371 National Stage Application of International Application No. PCT/EP2020/074474, filed Sep. 2, 2020, which is incorporated by reference in its entirety and published as WO 2021/043828 A1 on Mar. 11, 2021, not in English.

2. FIELD OF THE INVENTION

The field of the invention is that of logistics in stores and warehouses, and in particular the transport and sorting of articles.

More specifically, the invention relates to a system and a method for delivering an order.

The invention is used in particular for the collection of food or consumer products at a collection point, also known as a "drive", and for the delivery of goods at relay points.

3. STATE OF THE ART

It is known in stores offering an online order delivery service to a collection point, known as a "drive-through" service, that one or more pickers store the collected items of an order in bags on shelves, while waiting for the customer to come and collect the order. The sorting of the items in an order can be implemented during the pick-up round or when the order is put on the shelf.

This order picking technique has many disadvantages.

It requires a significant amount of storage space to store orders and a large workforce.

In addition, with this technique, a customer who comes to pick up his order may have to wait for a while for a picker to go and get his order from the shelves and hand it over to him, or in the case where all the pickers are busy with a collection round and are not available to hand over his order.

In order to limit the waiting time of a customer, it was thought to deposit the bags in bins which are sent to a storage space of an automated bin storage system allowing an easy delivery of his order to the customer.

A disadvantage of this technique using bins is that it requires the management of bins.

Another disadvantage of this technique is that it is expensive to implement. It has also been noted that in many large and medium-sized stores, the cost of installation is prohibitive.

4. SUMMARY

An exemplary aspect of the present disclosure relates to a system for automatically delivering an order, consisting of a plurality of items stored in a building, to a pick location for said order located outside said building.

According to the invention, such a system for automatic delivery of an order comprises:
 a plurality of pouches adapted to receive a bag;
 means for associating with selected pouches in said plurality of pouches in which articles of said order are deposited information identifying said order;
 means for signalling and/or detecting the presence of a user to whom the order is to be delivered, or of a truck intended to take charge of said order, in the vicinity of said picking location;
 a transport module mounted at least partially at height and comprising:
  at least one travel track, at least a substantial portion of which extends into said building;
  means for suspending said pouches from said track;
  means for automatically moving said suspension means on said track;
  means for actuating said automatic displacement means configured to displace the pouches in which the various items of said order have been deposited and to which information identifying said order has been associated, to said pick-up location when said signalling and/or detection means emit a signal confirming the presence of said user or said truck in the vicinity of said pick-up location.

Thus, in a novel way, the invention proposes to implement pouches suspended in height to transport and store parts of an order, bagged or not, up to a picking location outside a store, where the order will be given in an automatic way to the customer to whom the order is addressed, or to a delivery truck upon its arrival, close to the picking location.

The sampling location can be, for example, a dedicated parking area of a "drive" and be located more or less close to a store, or the storage volume of a truck.

In the context of the invention, the term "in the vicinity" means that the recipient of the order is less than a few metres, or even a few hundred metres, from the pick-up location. Thus, for example, it may be provided that the signalling and/or detection means are configured to emit a signal confirming the presence of the user or the truck when the latter stops in the immediate vicinity of the picking location or, in another embodiment, when the user or the truck passes through an entrance to the store's parking lot or passes through a specific location in the parking lot.

Finally, it should be noted that because the pouches are suspended high up, the invention saves a lot of floor space.

Furthermore, it will be noted that in the context of the invention, the track may extend both inside and outside the building or only inside the building.

According to a particular embodiment of the invention, said track comprises a chain housed in a rail.

In an advantageous embodiment of the invention, said track is attached to a ceiling or mezzanine of said building.

In an alternative embodiment of the invention, it may be envisaged to attach said track to a dedicated carrying structure, comprising for example one or more gantries.

Advantageously, said transport module comprises means for sorting the pouches of said plurality of pouches for grouping the pouches to which identification information of said order has been associated in at least one area of said building.

This means that the pouches containing the items in an order can be grouped together beforehand, which allows the order to be delivered more quickly.

According to an aspect of the invention, said signalling and/or detection means comprise at least one signalling and/or detection element belonging to the group comprising at least:
 barcode reader;
 QR code reader;
 magnetic strip or chip reader;
 numeric keypad to enter a code;
 dedicated application downloadable on a user's terminal;
 biometric identification reader, such as a fingerprint reader;
 presence sensor;
 geolocation system.

In a particular embodiment of the invention, said pouches are formed of a cloth, or a net, equipped with two handles.

Soft pouches have the advantage of being able to fold up and take up little space when they do not contain items In other embodiments of the invention, the pouches may be formed in whole or in part of rigid portions, for example to be able to carry heavy items, such as packs of mineral water, or fragile objects, such as boxes of eggs, for example.

Advantageously, said transport module comprises means for temporarily storing at least one of said pouches in at least one high storage area of said building.

Several high-bay storage areas can be provided to store items from different location.

In a particularly advantageous embodiment of the invention, said storage area is a temperature controlled area.

These areas can be positive cold storage areas or negative temperature storage areas, suitable for frozen products. In this way, fresh or frozen products can be taken in advance from the shelves of a shop or from cold rooms and stored on the transport module while waiting to hand over the order to the customer or to a truck that has come to collect the order.

According to a particular embodiment of the invention, said transport module comprises a tunnel enveloping a portion of said runway, extending outside of said building above a motor vehicle traffic lane.

This allows the recipient of an order to easily access the pick-up location with his vehicle and to load his order directly into his trunk.

According to a particular embodiment of the invention, said location for picking up said order is the loading volume of a truck.

Thus, you can easily load an order into a truck, which will ensure its delivery to a relay point.

In a particular embodiment of the invention, an automatic order delivery system as described above comprises a pouch storage module for mounting in the cargo volume of said truck and means for connecting said pouch storage module with said track, including means for transferring said pouches from said storage module to said track.

Thus it is possible to transfer the pouches of an order directly into a truck, or conversely to empty a truck, without human intervention.

The invention also relates to a method of automatically delivering an order, consisting of a plurality of items stored in a building, to a pick location for said order located outside said building.

According to the invention, such a method comprises the following steps:
  collecting the articles constituting said order and depositing at least part of said articles in at least one bag;
  depositing said one or more bags and items not deposited in a bag each in a pouch selected from a plurality of pouches and suspended from a track of a transport module mounted at least partially at height;
  associating with said pouches in which parts of said order have been deposited information identifying said order;
  signalling and/or detecting the presence of a user to whom the order is to be delivered, or of a truck intended to take charge of said order, in the vicinity of said pick-up location, comprising a step of transmitting a signal confirming the presence of said user or said truck in the vicinity of said pick-up location;
  upon reception of said signal by a receiver unit, transporting the pouches with which an identification information of the order has been associated on said track to said picking location comprising a step of automatic actuation of means for automatically moving means for suspending said pouches from said track.

According to an advantageous aspect of the invention, such a method comprises a step of sorting the pouches of said plurality of pouches comprising a step of grouping the pouches with which an identification information of said order has been associated in at least one zone of said building.

5. LIST OF FIGURES

Other features and advantages of the invention will become clearer upon reading the following description of two embodiments of the invention, given as mere illustrative and non-limiting examples, and of the appended drawings among which:

6. DETAILED DESCRIPTION OF THE INVENTION

6.1 Example of an Embodiment of the Invention

Figure 1:
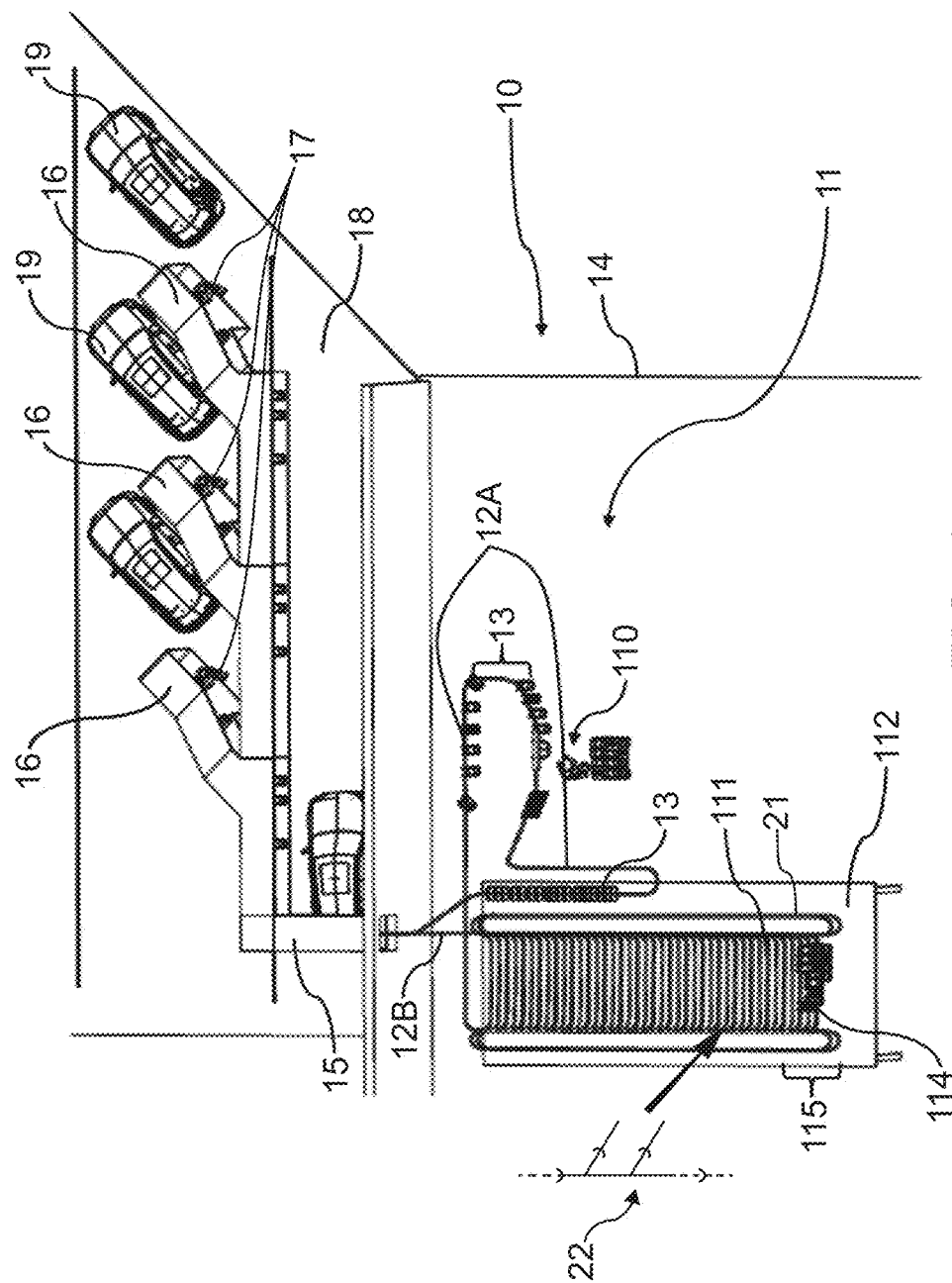
FIG. 1 is a top view of an example embodiment of an order delivery system according to the invention.
Figure 2:
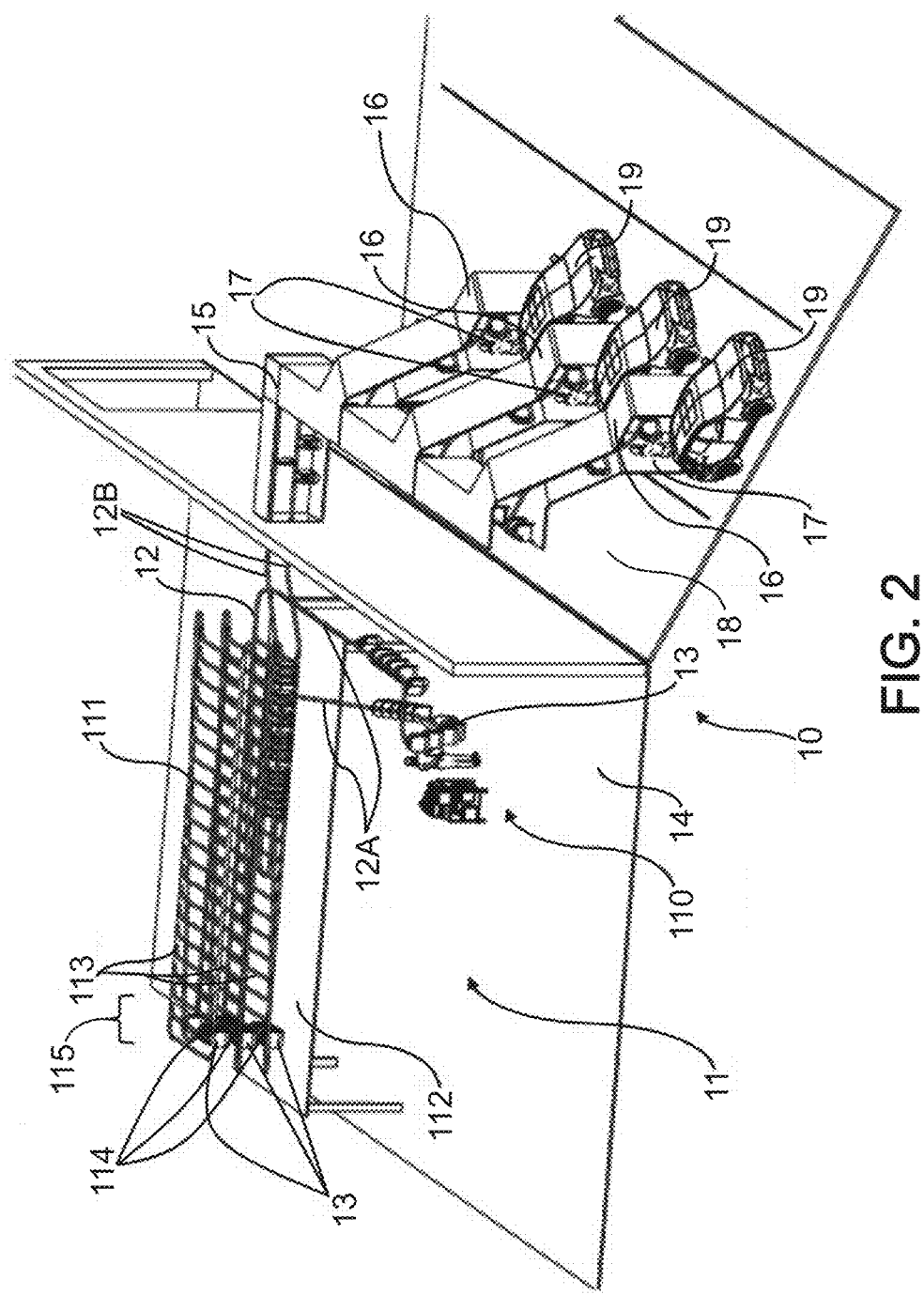
FIG. 2 is a perspective view of the order delivery system shown in FIG. 1.

FIGS. 1 and 2 illustrate, respectively in a top view and a perspective view, an example of an embodiment of an order delivery system 10 according to the invention, implemented on the site of a supermarket.

This system 10 comprises a transport module 11 having a circulation track 12 of flexible fabric pouches 13 formed from an assembly of rail sections in which motorized chains are mounted (a motor 21 shown schematically in FIG. 1).

In this embodiment of the invention, each pouch is suspended from links of a chain 20 (see FIG. 3) in the track by hooks. The pouches are automatically moved along a section of track by driving the chain 20 mounted in this track and transfer devices, such as pushers for example, are provided to move the pouches from one chain 20 to the other.

The track 12 is located in a warehouse 14 adjacent to the sales area of the supermarket and extends outside the warehouse through a tunnel 15 which leads to three order picking stations 16 with an opening to allow customers 17 receiving an order to pick up the various items in their order, delivered in bags or without bags.

The high tunnel advantageously runs above a traffic lane 18 allowing customers to park their vehicle 19 within arm's reach of an order picking station.

The track 12 consists of a first loop 12A which allows pouches to circulate between a pouch loading station 110 and a storage area 111 supported by a mezzanine 112, and a second loop 12B which allows pouches to be conveyed between the storage area 111 and the picking stations 16.

As can be seen in FIG. 2, the track has three sets of combs 113 superimposed at the storage area 111. Teeth 114 of the combs located at a distal end 115 of the storage area 111 are immersed in a positive cold storage environment, allowing fresh products to be stored there. The temperature at the other teeth of the combs is the ambient temperature of the warehouse.

It should be noted that, advantageously, in the storage area, the sides of the pouches 13 are folded against each other when the latter are not used to carry part of an order, thus saving space.

At the loading station 110, pickers arriving with a portion of an order place it in the pouch in front of them.

Figure 7:
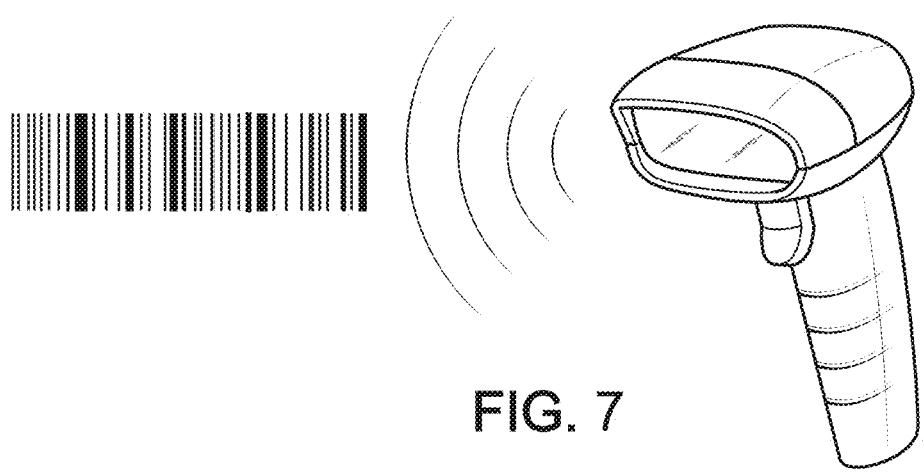
FIG. 7 is a view of a bar code and a bar code reader.

It will be noted that each of the pouches 13 carries an identifier, which in this particular embodiment of the invention consists of a bar code printed on one of the straps of the pouch. This identifier is read by a barcode reader (see FIG. 7) when the pouch is presented to the picker and transmitted to the supermarket's warehouse management system (also usually referred to by its acronym WMS, for "Warehouse Management System").

Once the order part has been deposited on the pouch 13, the picker simply confirms on a terminal, such as a touch pad, that the order part has been deposited in the pouch.

The warehouse management system then assigns the number of the order that has just been validated by the picker on his terminal to the pouch whose identifier has been scanned in its database for assigning pouches to orders.

Figure 3:
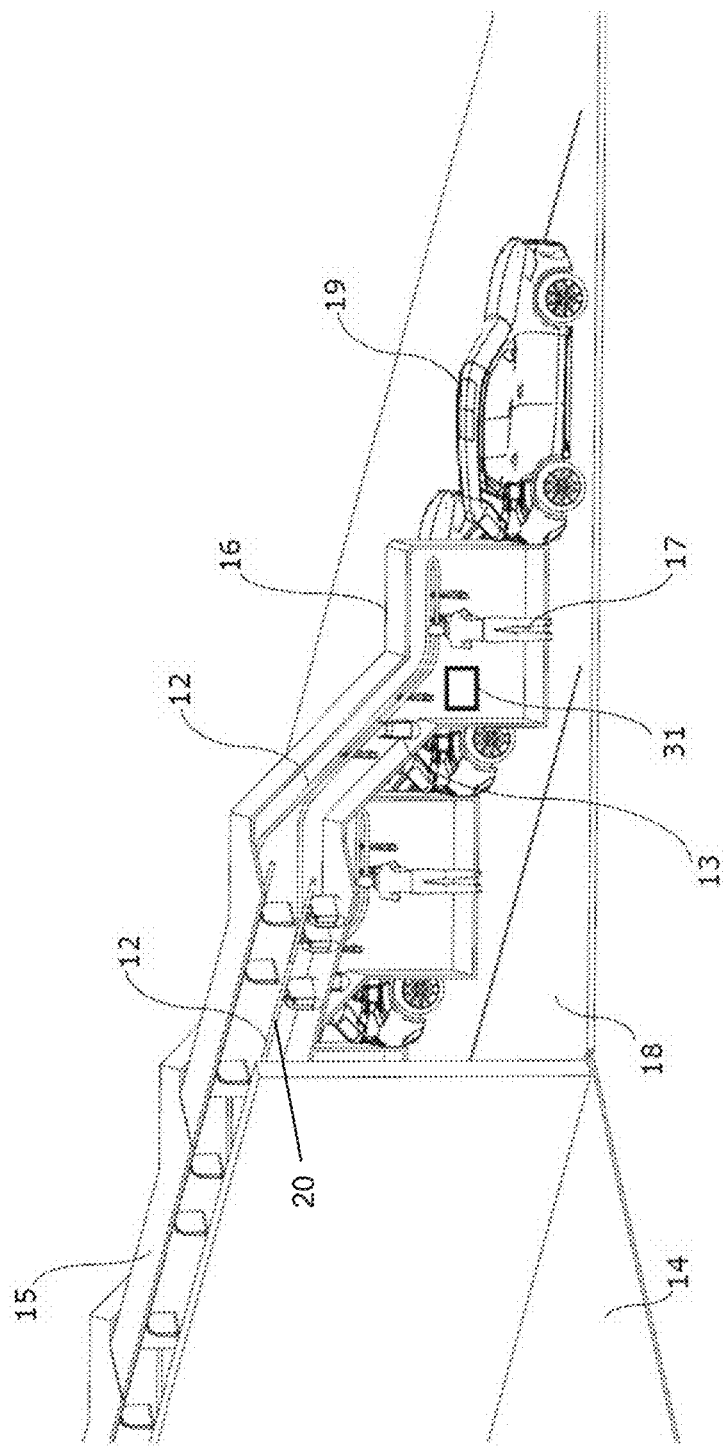
FIG. 3 is a partial cross-sectional detail view of the portion of the order delivery system shown in reference to FIG. 1, located outside the supermarket warehouse.

In FIG. 3, which is a partial cross-sectional detail view of the portion of the order delivery system 10 located outside of the supermarket warehouse, it can be seen that each pick station 16 is equipped with a touch screen 31 that allows the customer to enter a numerical code assigned to their order, which they received via email or SMS (short message service) on their smartphone. Entering this code allows the customer to signal their presence in front of one of the picking stations to the warehouse management system, which will then send a signal to the system 10 containing instructions to deliver the customer's order to the picking station where the customer 17 entered their code. The order delivery system 10 will then route the individual pouches containing portions of the customer's order to the tunnel 15 and distribute the individual pouches along the stretch of track connecting the tunnel to the pick station 16.

In variants of this particular embodiment of the invention, it may also be envisaged to allow the customer coming to pick up his order to signal his presence in the vicinity of the picking station by scanning a bar code or a QR code that he has received on his smartphone, by reading the magnetic strip of a store card assigned to this customer, by identifying himself using a biometric identification reader, or by using a dedicated application downloaded on his smartphone. In still other variants of this particular embodiment of the invention, it may be envisaged to use a geolocation system of the customer's smartphone in order to detect his presence in the vicinity of a picking station.

Figure 5:
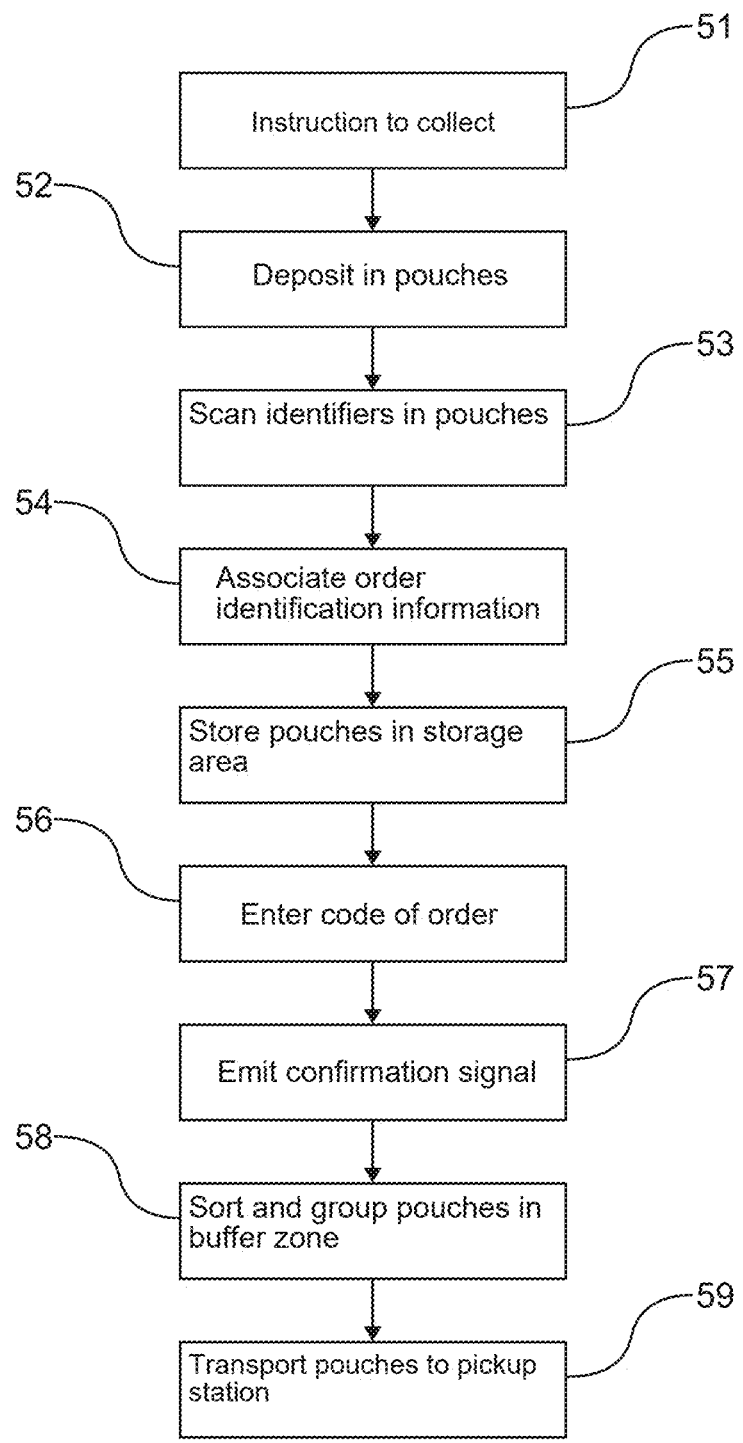
FIG. 5 is a synoptic representation, in the form of a block diagram, of an example of an order delivery method according to the invention.

In FIG. 5, the steps of an example of an embodiment of an order delivery method according to the invention implemented using the order delivery system 10 are shown in diagram form.

After the customer has placed an order for various items on the store's website, the warehouse management system sends instructions to pickers to collect the items in the order from the fresh, frozen, and dry goods areas and/or the store's stockroom (step 51). It should be noted that during this step, a picker can collect items for several different orders in the same collection round. During this collection, the pickers deposit certain items together in the same bag or in several bags (step 52).

In a step 53, the pickers go as soon as they have completed their pick-up round to the loading station 110 of the pouches 13 and deposit the bags and the articles that are not packed in bags each in one of the pouches of the delivery system of an order 10 that successively comes to the loading station.

It should be noted that, in the context of the invention, pickers may access the loading station in no predefined order and deposit bags or the bagless items in any order into the pouches that come to the loading station 110.

During this step 53, the identifier of each of the pouches that successively arrive at the loading station is scanned and transmitted to the warehouse management system.

After having placed a bag or an article in a pouch, the pickers confirm that the loading has been carried out using a touch pad and inform to which order the article that has been placed on the pouch corresponds. In a variant of this embodiment of the invention, it may also be envisaged that the operators scan a code printed on the order bags. An order identification information is then associated by the warehouse management system with the pouch waiting at the loading station (step 54) and this pouch is driven on the track of the displacement module, in order to make room for a new pouch.

The pouches in which articles have been deposited are then stored in a step 55 in a comb area of the storage area according to the content of the articles they carry, for example fresh articles are directed to area 115.

When a customer signals that he has arrived in the vicinity of an order picking station by entering the code of his order on the touch-sensitive keyboard of the picking station (step 56), a confirmation signal is emitted by the management system and transmitted, for example by radio waves, to the transport module 11 (step 57), which will then, in a first step 58, sort (see arrows 22 in FIG. 1) the pouches in order to group together the pouches with which an identification information of the order has been associated in a buffer zone of the track 12, before transporting them, in a step 59, through the tunnel 15 to the pick-up station to which the customer has come, so that he can withdraw the articles of his order.

6.2. Another Example of an Embodiment of the Invention

Figure 4:
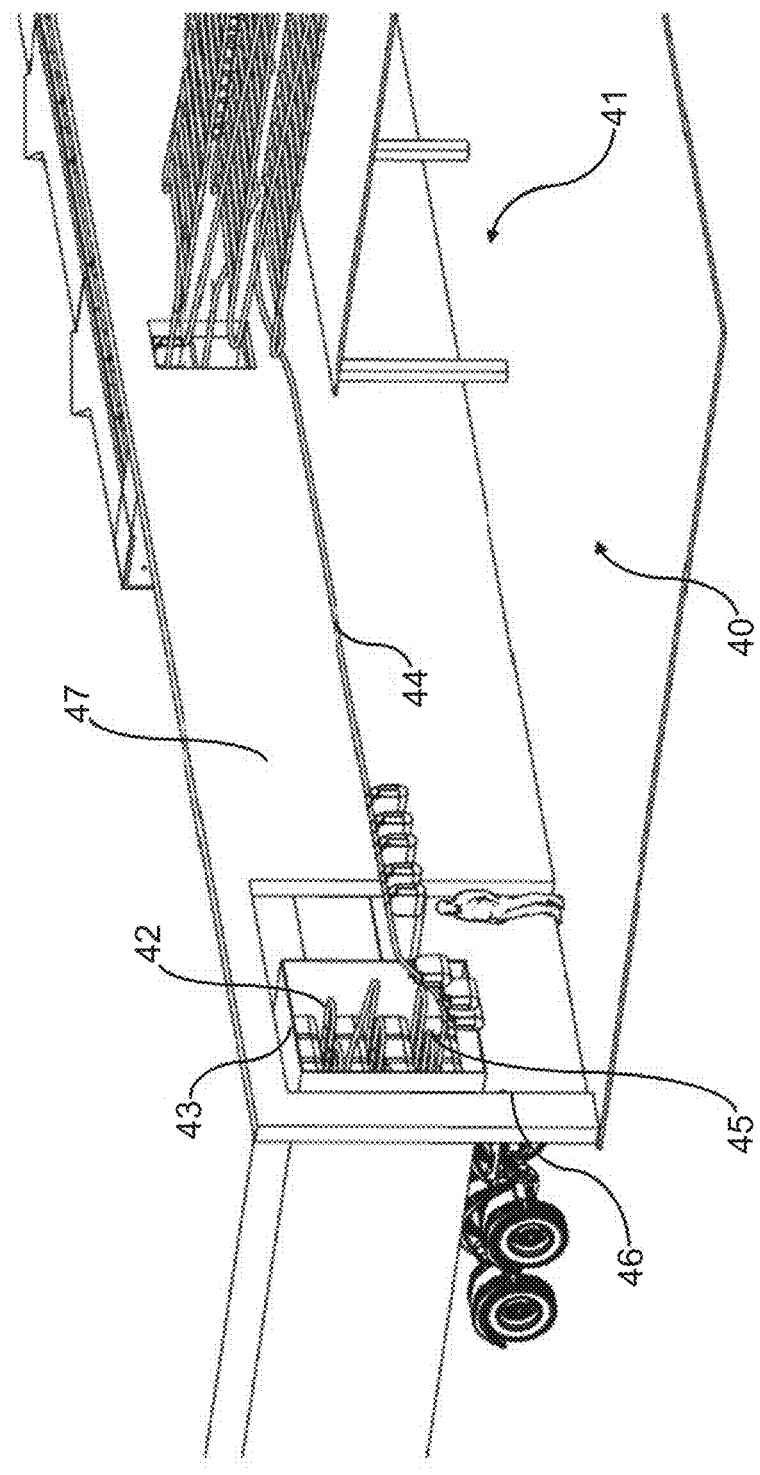
FIG. 4 is a partial perspective view of another example of an embodiment of an order delivery system according to the invention.

FIG. 4 shows another example of an order delivery system 40 according to the invention, allowing an order to be delivered to an order delivery truck at relay points.

As can be seen in FIG. 4, this system 40 comprises, in addition to a transport module 41 substantially identical to that of the order delivery system 11 described above, a motorized pouch storage module 42 mounted in the loading volume of a truck 43.

This storage module 42 can be connected to the track 44 of the transport module 41, via a connection unit 45 equipped with a device for transferring the pouches between the track 44 and the storage module 42, by moving the rear of the truck backwards to the level of a door 46 pierced in the outer walls of the warehouse 47.

It should be noted that in this embodiment of the invention, the pouch transfer device has a reversible operation and can as well transfer pouches from the track 44 to the storage module 42 as from the storage module to the track 42, in order to unload the truck of these pouches.

Figure 6:
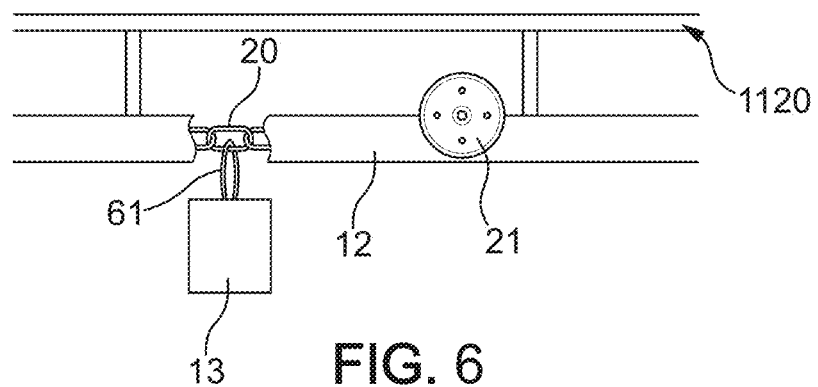
FIG. 6 is a partial side view of a portion of a delivery system having a track supported by a ceiling.

FIG. 6 illustrates a partial side view of a portion a delivery system having a track 12 supported by a ceiling 1120. The track 12 is equipped with an actuator 21, which is shown as a motor to drive the chain 20. A portion of the rail of the track 12 is broken to show the links of the chain 20.

An exemplary embodiment of the invention is intended in particular to overcome the above-mentioned drawbacks of the state of the art.

More specifically, an exemplary embodiment provides an order delivery technique that limits the number of operator interventions.

An exemplary embodiment provides such a technique for delivering a command that is simple to implement.

An exemplary embodiment provides such a control delivery technique that frees up floor space.

An exemplary embodiment provides such a technique with reduced cost price and reduced operating cost.

Although the present disclosure has been described with reference to one or more examples, workers skilled in the art will recognize that changes may be made in form and detail without departing from the scope of the disclosure and/or the appended claims.

The invention claimed is:

1. A system for automatically delivering an order, comprising a plurality of articles stored in a building, to a pick-up location for picking up said order located outside said building, wherein the system comprises:
- a plurality of pouches adapted to receive a bag;
- identifying information associated with selected pouches in said plurality of pouches in which articles of said order are deposited, where in the identifying information identifies said order;
- a signalling or detecting device, which signals and/or detects presence of a user to whom the order is to be delivered, or of a vehicle to take charge of said order, in a vicinity of said pick-up location;
- a transport module mounted at least partially at height and comprising:
  - at least one travel track, at least a substantial portion of which extends into said building;
  - suspension elements for suspending said pouches from said track;
  - an automatic displacement device, which is configured to automatically move said suspension elements on said track;
  - an actuator, which actuates the automatic displacement device and is configured to displace on the track the selected pouches in which articles of said order have been deposited and to which the identifying information of said order has been associated, to said pick-up location in response to the signalling and/or detecting device emitting a signal confirming the presence of said user or said vehicle in the vicinity of said pick-up location; and
  - a tunnel enveloping a portion of the track, extending outside the building above a motor vehicle traffic lane.

2. The system of claim 1, wherein said track comprises a chain housed in a rail.

3. The system according to claim 1, wherein said track is attached to a ceiling or a mezzanine of said building.

4. The system according to claim 1, wherein said transport module comprises a sorter, which sorts the pouches of said plurality of pouches to group together in at least one zone of said building the pouches to which the identifying information of said order has been associated.

5. The system according to claim 1, wherein said signalling and/or detection device comprises at least one signalling and/or detection element belonging to the group consisting of:
- barcode reader;
- QR code reader;
- magnetic strip or chip reader;
- numeric keypad to enter a code;
- dedicated application downloadable on a user's terminal;
- biometric identification reader;
- presence sensor;
- geolocation system.

6. The system according to claim 1, wherein said pouches are formed of a cloth, or a net, equipped with first and second handles.

7. The system according to claim 1, wherein said transport module comprises a storage area for temporarily storing at least one of said pouches in at least one high storage area of said building.

8. The system according to claim 7, wherein said storage area is a temperature controlled area.

9. The system according to claim 1, wherein said transport module comprises a tunnel enveloping a portion of said track, extending outside said building above a motor vehicle traffic lane.

10. The system according to claim 1, wherein said pick-up location of said order is a loading volume of the vehicle.

11. The system according to claim 10, which further comprises a pouch storage module, configured to be mounted in the loading volume of said vehicle, and a connector for connecting said pouch storage module with said track, and transferring said pouches from said storage module to said track.

* * * * *